United States Patent

Ippen et al.

[11] 3,957,101
[45] May 18, 1976

[54] PUNCTUREPROOF TIRE

[75] Inventors: Jakob Ippen, Leverkusen; Friedel Stüttgen, Cologne, both of Germany

[73] Assignee: Bayer Aktiengesellschaft, Leverkusen, Germany

[22] Filed: Mar. 31, 1975

[21] Appl. No.: 563,477

[30] Foreign Application Priority Data
Apr. 3, 1974 Germany............................ 2416204

[52] U.S. Cl..................................... 152/301; 152/5; 152/158; 152/209 R; 152/323; 152/379 R
[51] Int. Cl.² ...................... B60C 7/08; B60C 17/04
[58] Field of Search ................................. 152/8–10, 152/5, 151, 152, 158, 300, 301, 323, 324, 209 R, 362, 379

[56] References Cited
UNITED STATES PATENTS

| | | | |
|---|---|---|---|
| 966,674 | 8/1910 | Eynon | 152/301 |
| 1,282,562 | 10/1918 | Fowler | 152/301 |
| 1,493,190 | 5/1924 | Davis | 152/301 |

*Primary Examiner*—Drayton E. Hoffman
*Attorney, Agent, or Firm*—Connolly and Hutz

[57] ABSTRACT

A punctureproof non-pneumatic vehicle tire comprising two halves applied on a felly which is subdivided into two parts by a metal or plastic ring. The two symmetrical halves of the tire are built up of segments each of which consists of the tread, the foot, supported by a wire core, and a connecting part. This connecting part is curved and asymmetrically arranged so that the parts in adjacent segments are alternately directed towards the middle of the felly and the edge of the felly. The connecting parts substantially reduce the total mass of the tire and constitute the actual cushioning element.

9 Claims, 3 Drawing Figures

PUNCTUREPROOF TIRE

The load bearing element of pneumatic vehicle tires is the carcass. This is basically a hollow body in the form of a torus of vulcanized rubber containing reinforcing elements (textile or steel cord filaments) which are capable of withstanding tensile stress. The hollow body is filled with air under pressure and its walls are under tensile stress. The weight of the vehicle counteracts this strain and partially compensates it. If such a tire develops a leakage and loses its internal pressure, the compressive stress produced by the weight of the vehicle predominates and the tire loses its shape and is quickly destroyed by rolling motion.

Solid tires which do not contain compressed air as cushioning element (solid rubber tires) do not suffer from this disadvantage, but they have a very great mass and, when they are in rolling motion, accumulation of heat occurs which leads to destruction of the tire material.

It is an object of this invention to provide a tire which does not contain a cavity filled with compressed air but has so little mass that no heat accumulates. Such a tire is punctureproof.

Figure 1:
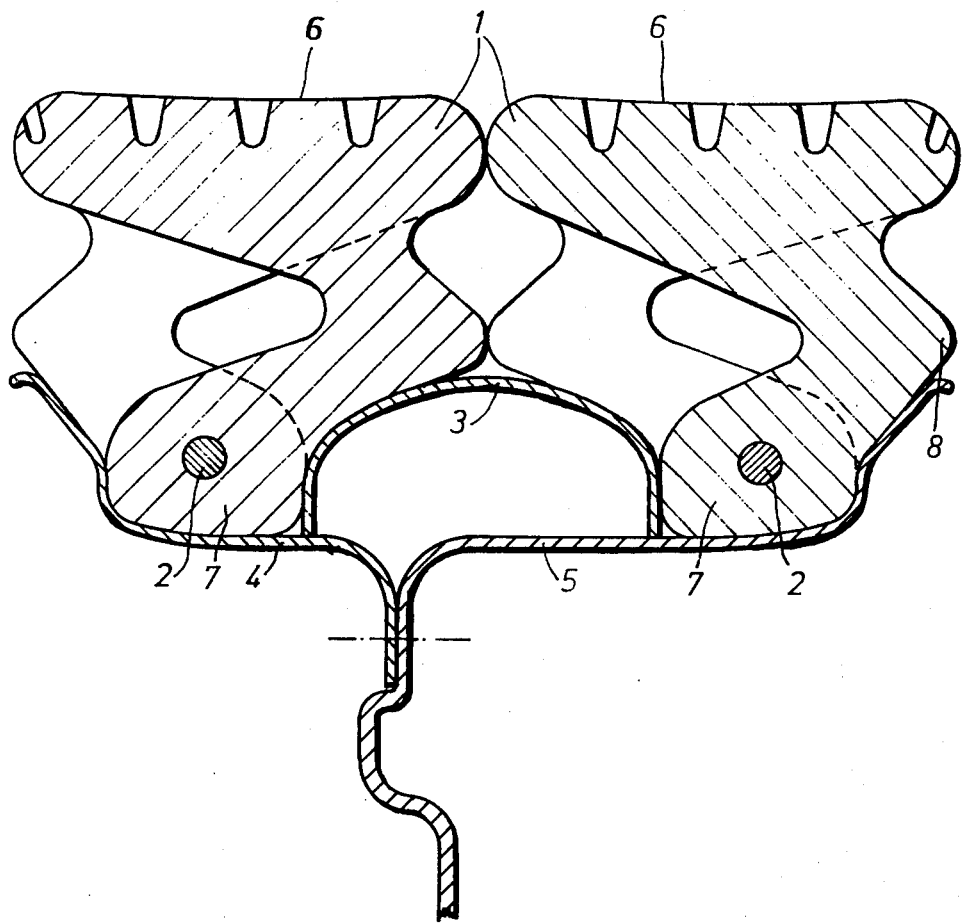
Figure 2:
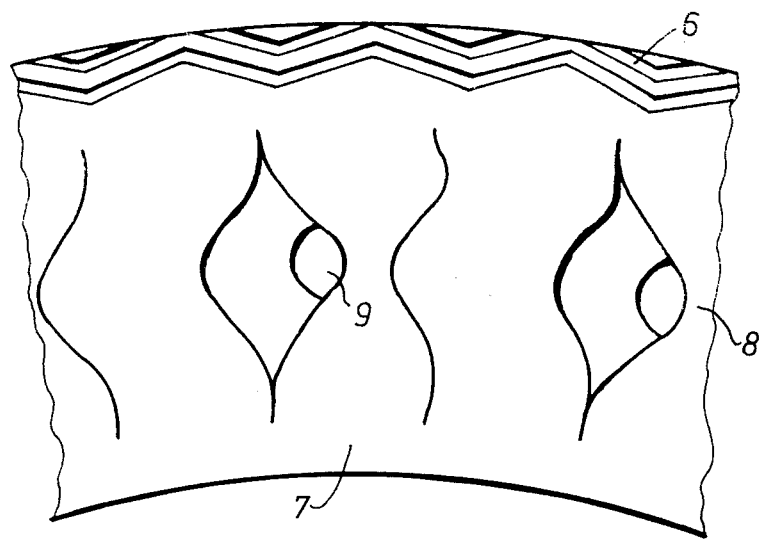

The tire according to this invention is illustrated in FIGS. 1 and 2.

Figure 3:
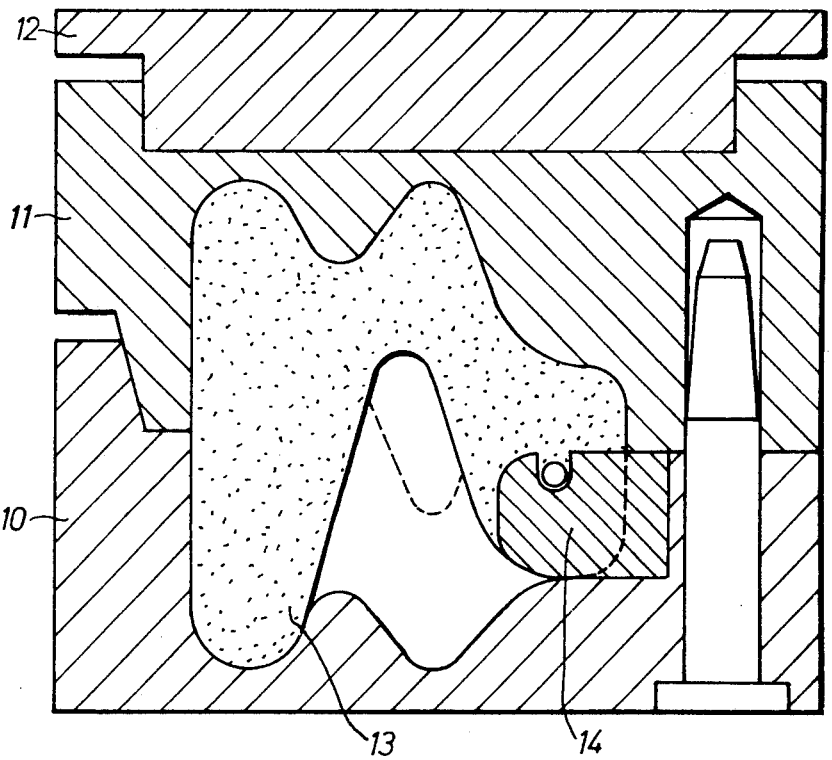

FIG. 3 is a cross-section through a mold for producing the tire shown in FIGS. 1 or 2.

FIG. 1 is a cross-section through the tire mounted on a felly. In the middle of the felly is a metal or plastic ring 3 which subdivides the felly into two parts 4,5. In each of these halves of the felly is arranged one half of the actual tire 1 supported by a wire core 2. The two halves of the tire 1 are symmetrical and consist of segments each of which comprises the tread 6, foot 7 and connecting part 8. This connecting part is curved and asymmetrically arranged so that the parts in adjacent segments are alternately directed towards the middle of the felly and the edge of the felly. These connecting parts arranged in alternating directions constitute the actual cushioning element. They substantially reduce the total mass of the tire and ensure adequate cooling when the tire is in motion.

FIG. 2 shows a section taken out of the side view of the tire. The tread 6 is connected to the foot 7 of the tire by the connecting parts 8. 9 indicates a recess in the tire, i.e. part of the air channels which are formed by the segmental arrangements.

This invention therefore relates to a punctureproof tire composed of two symmetric parts 1 arranged on a divided felly 4,5, the two parts 1 of the tire consisting of segments each of which is composed of a tread part 6, a foot 7 and an asymmetric connecting part 8 which is curved alternately towards the edge of the felly and towards the middle of the felly in successive segments.

The tires according to the invention in which the ratio of height to width of the whole tire is 0.45 i.e. the height/width ratio of one tire half is 0.9, are preferred.

The tires according to the invention may be made of any natural or synthetic rubber whose vulcanizates have a Shore A hardness of from 65 to 90 and a stress ratio of from 110 to 200 kp/cm² at 300% elongation. Natural rubber, styrene/butadiene rubber, polybutadiene and ethylene/propylene terpolymer rubber (third component: non-conjugated diene, such as 1.4-hexadiene, dicyclopentadiene, ethylidene-norbornene) are particularly suitable.

The tires according to the invention may be produced in a simple transfer mould and in a single operating step. No reinforcing elements are required except for the wire ring in the foot of the tire.

The diameter of the felly is slightly larger than in pneumatic tires of the same size. This allows for larger brake drums beside the felly and hence provides for better cooling of the brake surfaces.

The weight of the tire is only 25 to 30% greater than that of a comparable pneumatic tire. The properties of the tire may be influenced inter alia by the number of its segments. Each tire half preferably has from 20 to 100 segments, more preferably from 40 to 60 segments.

EXAMPLE

The tire is produced in an annular transfer mould. A section through this mold is shown in FIG. 3, in which 10 denotes the lower half of the mold 11 the upper half, 12 the pressure piston, 13 the internal cavity of the mold and 14 an arrangement of plates to hold the wire ring.

The wire ring is first placed into the lower half of the mold and fixed by the plates. A vulcanizable rubber mixture is then introduced into the upper half of the mold and the mold is closed and put under a pressure (about 100 kg/cm²) by the piston 12. The mold is then heated to 145°–175°C for from 15 to 30 minutes. The tire is then removed. The wire core in the foot of the tire is a solid, copper-plated steel wire. It is not subjected to bending stress as it would be in pneumatic tires. The tire has 48 segments.

The tires are produced from the following rubber mixtures:

| | |
|---|---:|
| Natural rubber | 25.0 |
| Styrene/butadiene copolymer | 25.0 |
| cis-1,4-polybutadiene | 50.0 |
| Carbon black N-330 | 80.0 |
| resin | 4.0 |
| Stearic acid | 2.0 |
| N-isopropyl-N'-phenyl-p-phenylenediamine | 2.5 |
| 2,2,4-trimethyl-1,2-dihydroquinoline, polymerised | 1.5 |
| Zinc oxide | 5.0 |
| Benzothiazyl-2-cyclohexyl sulphenamide | 1.2 |
| Insoluble sulphur | 2.66 |
| | 198.86 |

| | |
|---|---:|
| Mixing plasticity at 80°C Defo hardness/Defo elasticity | 7700/17 |
| Tensile strength (kp/cm²) | 199 |
| Elongation at break (%) | 310 |
| Tension at 300% elongation (kp/cm²) | 191 |
| Tear propagation resistance according to Pohle (kp/4 mm) | 16 |
| Hardness (Shore A) at 20°C | 82 |

| | |
|---|---:|
| Natural rubber | 80.0 |
| cis-1,4-polybutadiene | 20.0 |
| carbon black N-330 | 55.0 |
| Aromatic mineral oil | 3.0 |
| Stearic acid | 2.5 |
| Ozone protective wax | 1.0 |
| N-isopropyl-N'-phenyl-p-phenylenediamine | 2.5 |
| 2,2,4-Trimethyl-1,2-dihydroquinoline, polymerised | 1.5 |
| Zinc oxide | 5.0 |
| Benzothiazyl-2-sulphene morpholide | 1.2 |
| Insoluble sulphur | 1.9 |
| | 173.6 |

| | |
|---|---:|
| Mixing plasticity at 80°C Defo hardness/Defo elasticity | 1100/15 |
| Tensile strength (kp/cm²) | 219 |
| Elongation at break (%) | 460 |
| Tension at 300% elongation (kp/cm²) | 130 |
| Tear propagation resistance according to Pohle (kp/4 mm) | 37 |
| Hardness (Shore A) at 20°C | 66 |

-continued

| | |
|---|---|
| Oil extended styrene/butadiene copolymer | 68.5 |
| Oil extended cis-1,4-polybutadiene | 68.5 |
| Carbon black N-220 | 95.0 |
| Aromatic mineral oil | 20.0 |
| Resin | 2.0 |
| Stearic acid | 2.0 |
| Ozone protective wax | 1.5 |
| N-isopropyl-N'-phenyl-p-phenylenediamine | 2.5 |
| 2,2,4-Trimethyl-1,2-dihydroquinoline, polymerised | 1.5 |
| Zinc oxide | 3.0 |
| Benzothiazyl-2-cyclohexylsulphenamide | 1.5 |
| Tetramethylthiuramic monosulphide | 0.2 |
| Insoluble sulphur | 2.4 |
| | 268.6 |
| Mixing plasticity at 80°C | |
| Defo hardness/defo elasticity | 1550/16 |
| Tensile strength (kp/cm²) | 155 |
| Elongation at break (%) | 410 |
| Tension at 300% elongation (kp/cm²) | 108 |
| Tear propagation resistance according to Pohle (kp/4 mm) | 24 |
| Hardness (shore A) at 20°C | 66 |

We claim:

1. A vehicle tire comprising two halves adapted to lie alongside one another when the tire is mounted on a wheel rim having a pair of edges which is subdivided by a central annular ring into two lateral parts, each half of the tire having an outer tread surface adapted to contact a roadway, an inner surface adapted to contact one half of the subdivided wheel rim, a resilient connecting part being segmentally divided and diagonally constructed and arranged in a uniformly and oppositely arranged hollow configuration having continuous air channels, and successive segments of the resultant diagonal hollow configuration being alternately directed to and supported by an edge of the wheel rim and the central annular ring of the subdivided rim whereby the continuous air channels in the diagonal segmental arrangement of the connecting part substantially reduces the weight of the tire and insure adequate cooling when the tire is in motion.

2. A tire as claimed in claim 1 in which each half additionally comprises a reinforcing element.

3. A tire as claimed in claim 2 in which the reinforcing element is a wire core.

4. A tire as claimed in any of claim 1 in which the segments of one half lie alongside the segments of the other half in register with one another.

5. A tire as claimed in any of claim 1 in which the ratio of height: width of the whole tire is 0.45.

6. A tire as claimed in any of claim 1 in which each tire half has from 20 to 100 segments.

7. A tire as claimed in claim 6 which has from 40 to 60 segments per tire half.

8. A tire as claimed in claim 1 which is made from natural rubber and/or styrene/butadiene rubber and/or butadiene and/or ethylene/propylene terpolymer rubber.

9. A tire as claimed in any of claim 1 which is made from a vulcanised rubber having a Shore A hardness of from 65 to 90 and a stress ratio of from 110 to 200 kp/cm² at 300% elongation.

* * * * *